No. 656,850. Patented Aug. 28, 1900.
W. H. McFADDEN.
CAISSON.
(Application filed June 27, 1900.)
(No Model.) 14 Sheets—Sheet 2.

FIG. 2.

WITNESSES:
INVENTOR
William H. McFadden
by Samuel S. Wolcott Att'y.

No. 656,850.  
Patented Aug. 28, 1900.  
W. H. McFADDEN.  
CAISSON.  
(Application filed June 27, 1900.)  
(No Model.)  
14 Sheets—Sheet 4.

WITNESSES:

INVENTOR  
William H. McFadden  
by Dammi S. Wolcott Att'y.

No. 656,850. Patented Aug. 28, 1900.
W. H. McFADDEN.
CAISSON.
(Application filed June 27, 1900.)
(No Model.) 14 Sheets—Sheet 7.

WITNESSES:

INVENTOR
William H. McFadden
by Darwin S. Wolcott
Att'y.

No. 656,850. Patented Aug. 28, 1900.
W. H. McFADDEN.
CAISSON.
(Application filed June 27, 1900.)
(No Model.) 14 Sheets—Sheet 8.

WITNESSES:
F. M. Dapper
J. H. Bradley

INVENTOR
William H. McFadden
by Dennis B. Wolcott Att'y.

No. 656,850. Patented Aug. 28, 1900.
W. H. McFADDEN.
CAISSON.
(Application filed June 27, 1900.)
(No Model.) 14 Sheets—Sheet 9.

FIG. 15.

WITNESSES:

INVENTOR
William H. McFadden
by Darwin S. Wolcott
Att'y.

No. 656,850. Patented Aug. 28, 1900.
W. H. McFADDEN.
CAISSON.
(Application filed June 27, 1900.)
(No Model.) 14 Sheets—Sheet 10.

FIG. 16.

WITNESSES:
F. M. Dapper
J. H. Bradley

INVENTOR
William H. McFadden
by Davarri & Wolcott
Att'y.

No. 656,850. Patented Aug. 28, 1900.
W. H. McFADDEN.
CAISSON.
(Application filed June 27, 1900.)

(No Model.) 14 Sheets—Sheet 13.

FIG.19.

WITNESSES:

INVENTOR

No. 656,850. Patented Aug. 28, 1900.
W. H. McFADDEN.
CAISSON.
(Application filed June 27, 1900.)

(No Model.) 14 Sheets—Sheet 14.

FIG. 20.

WITNESSES:
INVENTOR
William H. McFadden
by Dannis & Wolcott Att'y.

UNITED STATES PATENT OFFICE.

WILLIAM H. McFADDEN, OF PITTSBURG, PENNSYLVANIA.

CAISSON.

SPECIFICATION forming part of Letters Patent No. 656,850, dated August 28, 1900.

Application filed June 27, 1900. Serial No. 21,748. (No model.)

*To all whom it may concern:*

Be it known that I, WILLIAM H. MCFADDEN, a citizen of the United States, residing at Pittsburg, in the county of Allegheny and State of Pennsylvania, have invented or discovered certain new and useful Improvements in Caissons, of which improvements the following is a specification.

The invention described herein relates to certain improvements in apparatus for dredging and removing earth, stones, &c., from the bottoms of rivers, lakes, &c., and also for the leveling up of the bottoms of such bodies of water or for clearing or cleaning the same, as desired.

Among other things the invention has for one object a construction of caisson and hoisting mechanism connected therewith whereby the continuous removal of material from the caisson may be effected without in any way interrupting or disturbing the fluid seal, whereby a certain predetermined pressure can be maintained in the caisson to prevent the ingress of water.

It is a further object of the invention to provide for an extension of the caisson, so as to render it available at different depths.

The invention is hereinafter more fully described and claimed.

In the accompanying drawings, forming a part of this specification.

Figure 18:
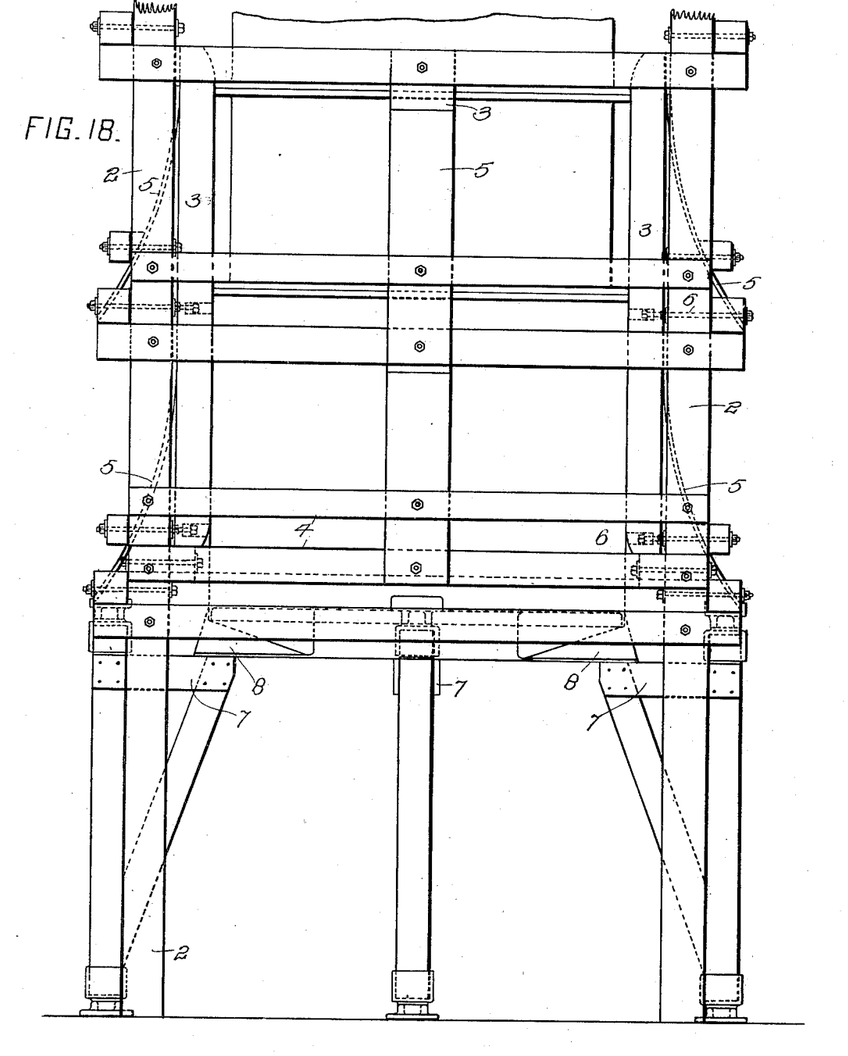
Figs. 18, 19, and 20 are views in elevation showing the manner of guiding and supporting the upper part of the caisson as against lateral movement and also supporting the air-chamber and submerging-tank while adding or removing sections of the lower portion of the caisson.
Figure 19:
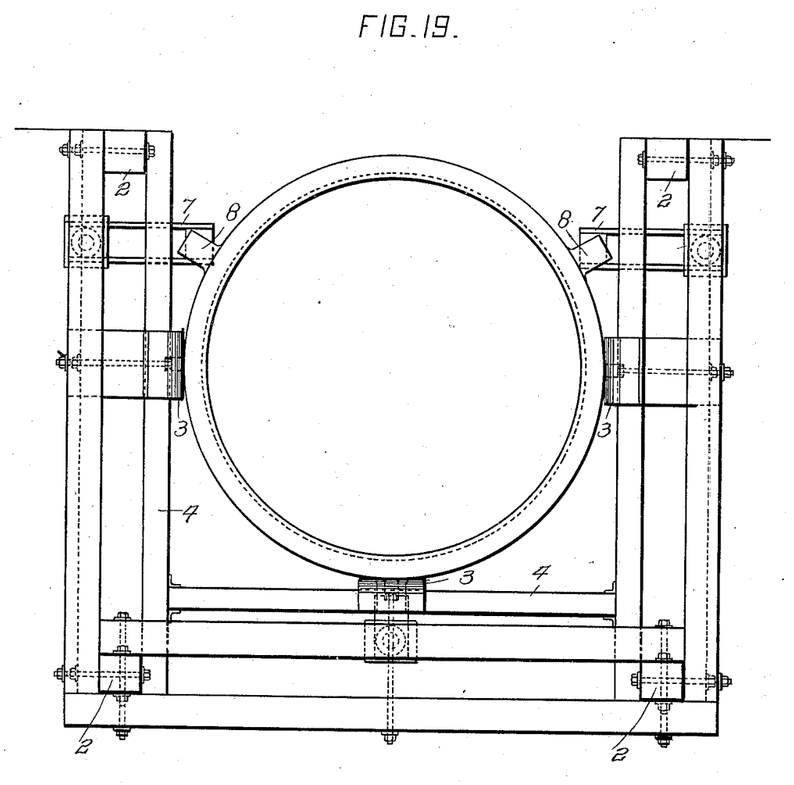
Figure 20:
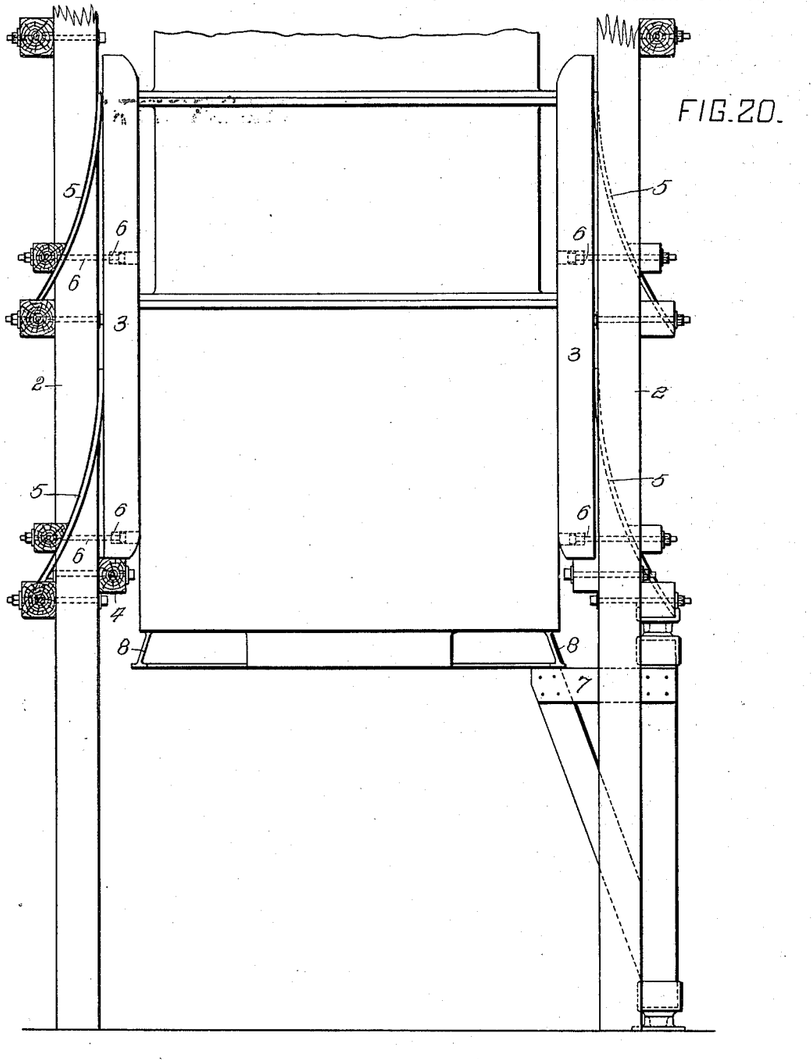

In the practice of my invention the float or scow 1 is provided at one end with a recess in which is located the caisson to be hereinafter described. On the float and around the edges of the recess are secured posts and uprights 2, which serve as lateral supports and guides for the caisson in its vertical movements. When the caisson is resting upon the bottom, the surface movement of the water will impart an oscillation to the float or scow, which would tend if the posts or uprights bore directly on the sides of the caisson to sway the latter back and forth. In order to permit a certain amount of movement of the scow independent of the caisson, bearing-boards 3 are movably mounted on the frame, of which the posts 2 form a part, their lower ends resting upon cross-timbers 4, as clearly shown in Figs. 18, 19, and 20. These boards are pressed against the sides of the caisson by means of springs 5, having one end secured to the frame, while their opposite ends bear against the rear sides of the boards.

These boards are held with the freedom of in-and-out movement by means of bolts 6, passing loosely through the boards and secured to the frame. It will be readily understood that by this construction a certain amount of oscillation of the scow is permitted without materially disturbing the vertical position of the caisson. For the purpose of supporting the air-chamber and submerging-tank when it is desired to shift the float and caisson or to insert or remove sections thereof supporting-arms 7 are pivotally mounted upon the scow in such relation to the normal position of the caisson that the arms can be swung in under lugs 8, formed at the lower end of the air-chamber.

The caisson consists, essentially, of an air-chamber, a submerging-tank E, arranged above the air-chamber B, a working chamber C at the lower end of the caisson, a tubular shaft or tunnel connecting the air-chamber and working chamber, and a discharge-conduit, as will be hereinafter described.

As shown in Figs. 5 to 8, the air-chamber consists, substantially, of a metal shell having on opposite sides double walls 9 and 10, each provided with doors 11 for the ingress and egress of the workmen. These doors are constructed in the usual or any suitable manner and provided with suitable locks, whereby they may be firmly secured in a closed position and when so secured hermetically seal the spaces or chambers A between the double walls. Within chambers D, formed above the air-locks and provided with doors 11ª, are placed electric motors 12 and 13. The motor 12 is employed for operating through suitable gearing and counter-shaft 12ª, the vertical shaft 14 extending down to or toward the lower end of the caisson and employed for shifting the digging-bucket, as will be hereinafter described. The motor 13 is connected by suitable gearing to the shaft 15 within the main chamber B, and on said shaft is secured a drum 16 for hoisting a bucket 17. This bucket can be used with the conveyer or digging buckets, hereinafter described, for the removal of dirt, &c., from the bottom of the caisson, but is generally employed for the removal of large stones or other substances which would not pass readily through the discharge-conduit. The rope 18, by which the bucket is raised, passes around a guide-pulley 19, secured to the top of the air-chamber B, and around a pulley 20, mounted on an arm 21, attached to the lid or cover 22 of the discharge-box 23. This discharge-box extends through the bottom of the air-chamber into a receiving-chamber 24, secured to the under side of the air-chamber. The lid 22 when in normal or closed position forms a tight joint with the edges of the box, so as to prevent any material loss of air. As the bucket is raised the bail thereof will strike against the arm 21, so as to lift the lid 22 on the continued upward movement of the bucket, which as soon as it reaches discharge position, as shown by dotted lines in Fig. 7, will tip, its holding-lock being released, and discharge its contents into the box 23. On the shaft 15 is secured a disk 25, having a strap 26 arranged around it, one end of said strap being connected to a suitable stationary support, while the opposite end is connected to one arm of a bell-crank lever 27. The opposite end of this bell-crank lever is connected to a suitable shifting mechanism, which preferably consists of a solenoid 28, having its core connected to the lever. The circuit of this solenoid is controlled by a switch or controller, which also controls the current to the motor 13, so that when the current is cut off from the motor the circuit of the solenoid will be closed, so that the core of the latter will be shifted to apply the brake to the shaft 15, and thereby hold the bucket 17 at any desired elevation. As soon as the contents of the bucket have been discharged into the box the controller of the motor 13 and solenoid 28 is reversed, so as to break the circuit of the solenoid, allowing the bucket to drop, and thereby permit the closing of the lid 22.

In order to remove dirt, stones, &c., from the receiving-chamber 24 and also to prevent the loss of air when the lid 22 is opened, as before stated, the box 24 forms a part or enlargement of a pipe 30, through which water is caused to flow in a sufficient volume to entirely fill the pipe and with a pressure or head equal to and preferably a little above the pressure of the air within the air-chamber B. This pressure or head within the pipe 30 is produced and maintained by reducing the discharge-orifice beyond the carrying capacity of the pipe and forcing in a supply of water in excess of the delivery capacity of such orifice. This stream of water not only serves to remove dirt, &c., from the box 24, but also as a seal to prevent the escape of air from the air-chamber when the lid 22 is opened. In case the rocks, &c., discharged into the chamber 24 cannot be removed through the pipe 30 the box is provided with a removable bottom 31, hinged to one side of the box and held in position by any suitable form of lock 32. After the lid 22 has been closed the bottom 31 can be opened and the rocks or other substances removed without any loss of air, except such small volume as may be contained within the boxes 23 and 24. The discharge-pipe 30 is also provided with a removable section 30ª for the removal of any substance which cannot be removed by the water.

Figure 7:
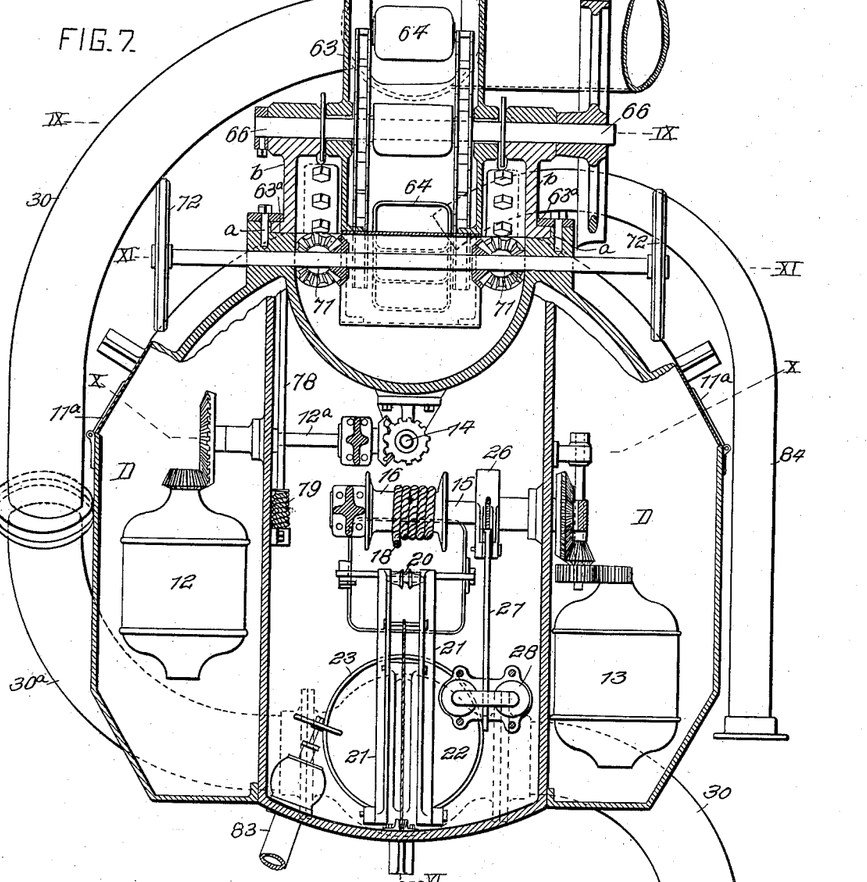
Fig. 7 is a sectional plan view, the plane of section being indicated by the line VII VII, Fig. 6.
Figure 8:
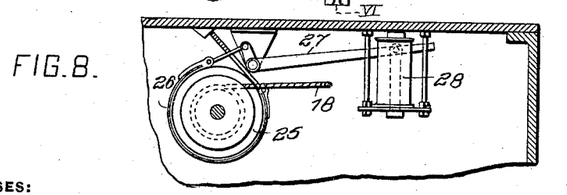
Fig. 8 is a sectional detail view illustrating the brake mechanism for the bucket-hoist.
Figure 9:
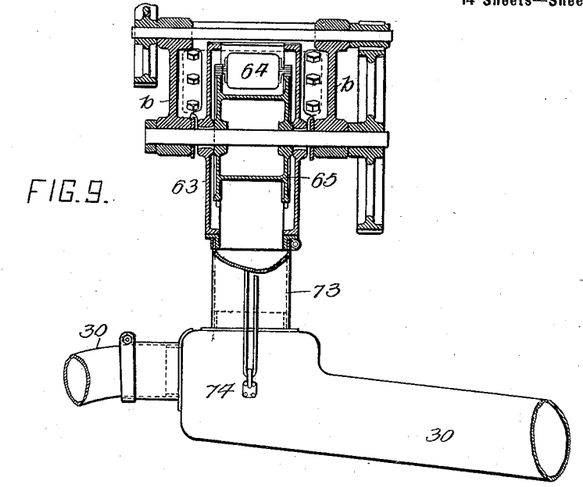
Fig. 9 is a sectional detail view on a plane indicated by the line IX IX, Figs. 6 and 7.
Figure 10:
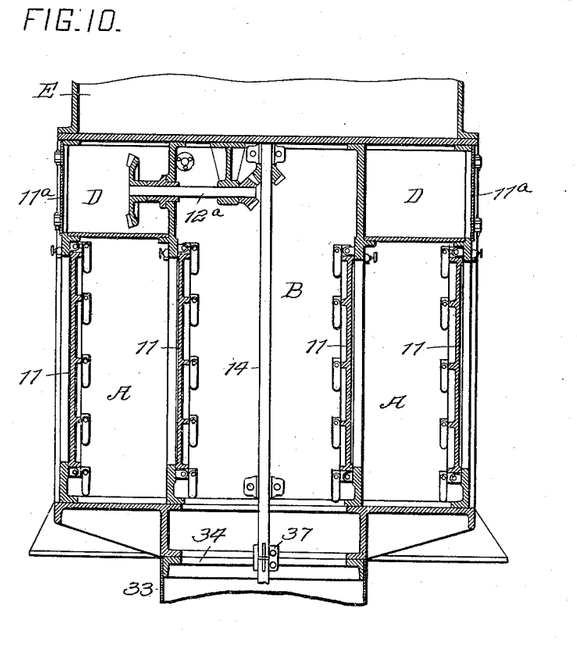
Fig. 10 is a sectional elevation through the air-chamber, locks, and motor-chambers on a plane indicated by the line X X, Figs. 6 and 7.
Figure 15:
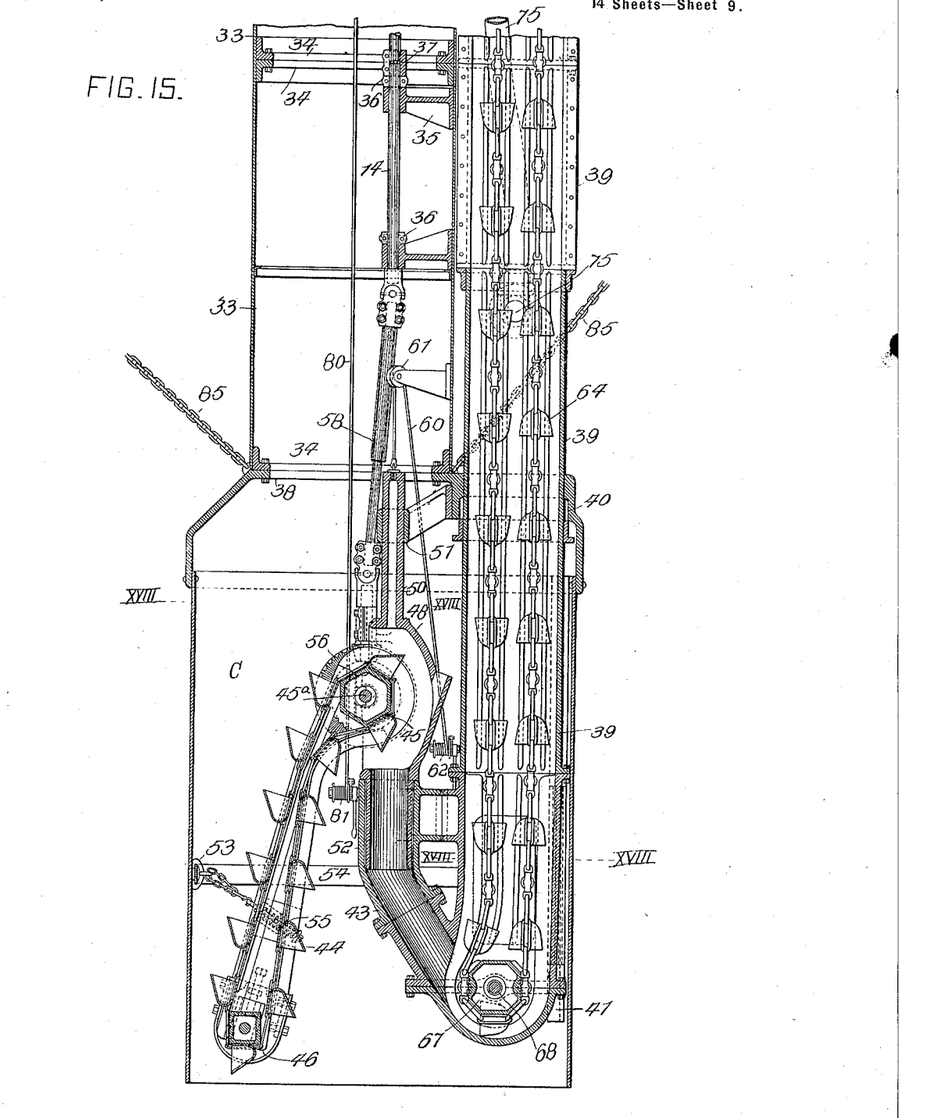
Figs. 15 and 16 are sectional elevations of the lower portion of the caisson, the planes of section being indicated, respectively, by the lines XV and XVI, Fig. 17.
Figure 16:
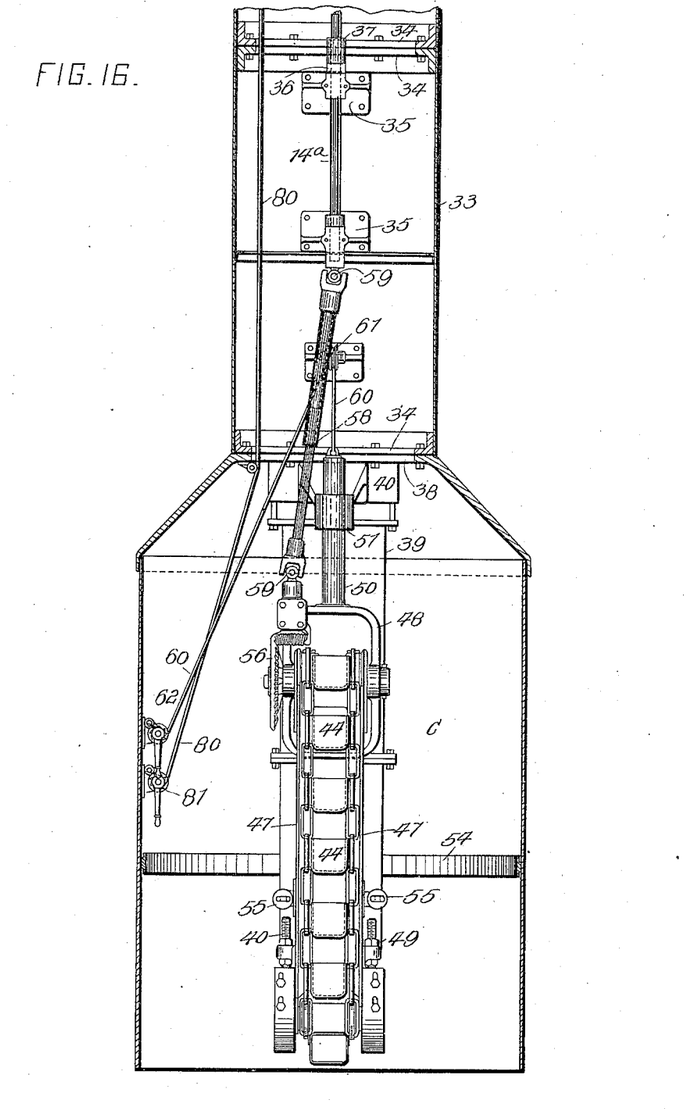

The tunnel or tubular shaft connecting the air-chamber with the working chamber at the lower end of the caisson is formed of a series of sections 33, provided at their ends with inwardly-projecting flanges 34, whereby they may be bolted together and to the under side of the air-chamber and the top of the working chamber C. Each of these sections is provided with brackets 35, having their outer ends suitably shaped to form bearings for the sections of the vertical shaft 14. Each of these shaft-sections is made of the same length as the sections composing the tunnel or tubular shaft and is held from vertical movement by collars 36, secured to the shaft-sections 14 and resting on the brackets, as shown in Figs. 7, 15, and 16. When a section 33 is introduced into the tubular shaft or tunnel, the driving-shaft sections 14 are connected together by couplings 37, thereby forming a continuous driving-shaft for the entire length of the caisson.

Figure 17:
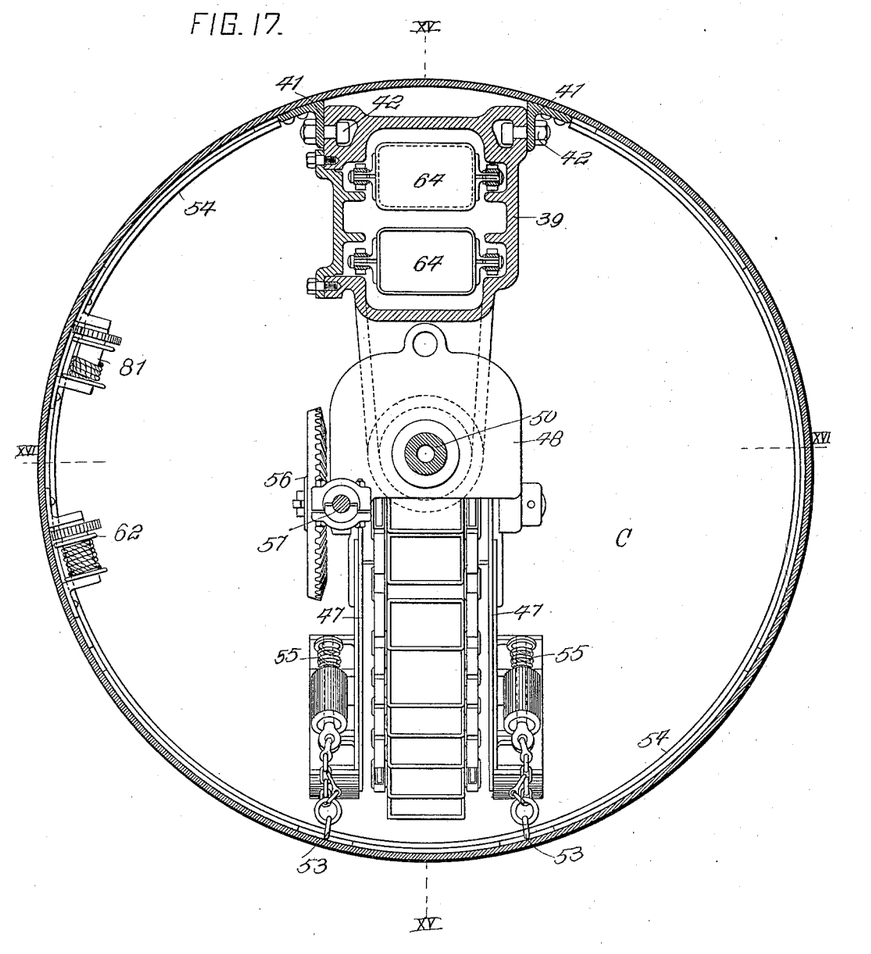
Fig. 17 is a sectional plan view on planes indicated by the lines XVII XVII, Fig. 15.

As shown in Figs. 15, 16, and 17, the working chamber C consists of a cylindrical metal shell open at its lower end and provided at its upper end with flanges 38, whereby it may be bolted to the lower section 33 of the connecting-tunnel. Within this working chamber is arranged the lower end of the discharge-conduit 39, which enters through a stuffing-box 40 in the upper end of the working chamber at one side of the tubular shaft or tunnel 33 and is capable of movement up and down in said chamber, as will be hereinafter described. The conduit is held in position in the working chamber by vertical guides 41, to which the conduit is attached by means of bolts 42, as shown in Fig. 17. The lower end of the conduit is closed, but is provided with an upwardly-projecting branch 43, into which the dirt to be removed is discharged by buckets 44 on an endless belt passing around a driving-pulley 45 and a guide-pulley 46. The pulley 45 is mounted on a shaft which has bearings in the sides of the turning-head 48. The bearings for the shaft of the guide-pulley 46 are made movable on the side plates 47, so that by the turning of the adjusting-screws or nut 49 the tension of the belt carrying the buckets can be regulated as desired. The turning-head is provided at its upper end with a stem 50, extending through a bearing 51, formed at the end of a bracket secured to the wall of the working chamber. At its lower end the turning-head is provided with a tubular stem 52, fitting loosely into the upper end of the branch pipe 43, as shown in Fig. 15. As the parts are so proportioned that the upper end of the branch 43 is nearly in the center of the working chamber, the frame carrying the buckets 44 can be turned through an arc of nearly three hundred and sixty degrees, or from one side of the discharge-conduit around to the opposite side. The side plates 47 are pivotally mounted upon the shaft 45$^a$, so that their lower ends can be moved out and in from near the center of the working chamber to close proximity to its outer wall. The frame carrying the buckets 44 is held in working position by means of yokes 53, engaging a band 54, secured to the side of the working chamber. These yokes 53 are free to slide around on the band and are connected to the side plates 47 by means of chains and spring-cushions 55. These spring-cushions will permit the lower end of the frame carrying the buckets 44 to yield slightly in case the buckets should strike against a rock or other unyielding substance. On the shaft 45$^a$ is secured a beveled pinion 56, intermeshing with the corresponding pinion on the short shaft 57, mounted in suitable bearings secured to the turning head 48. This short shaft is connected to the lower section of the driving-shaft 14 by means of an extensible shaft 58, consisting of a tubular portion for the reception of a solid portion, as shown in Fig. 16, said parts being keyed together, so that they are free to move along each other, but are caused to rotate one with the other. The ends of this extensible section are connected by universal joints 59 to the driving-shaft 14 and the short shaft 57, carried by the turning head 48. This construction permits of the raising and lowering of the turning head and the parts carried thereby, and also the lateral shifting of such parts, without interfering with the operation of the buckets. The turning head and the parts carried thereby can be raised or lowered, as required, by any suitable means—such, for example, as that shown, consisting of a rope 60, connected to the stem 50 of the turning head and passing around guide-pulley 61 and having its opposite end connected to a suitable winding-drum 62, mounted on the side of the working chamber.

Figure 6:
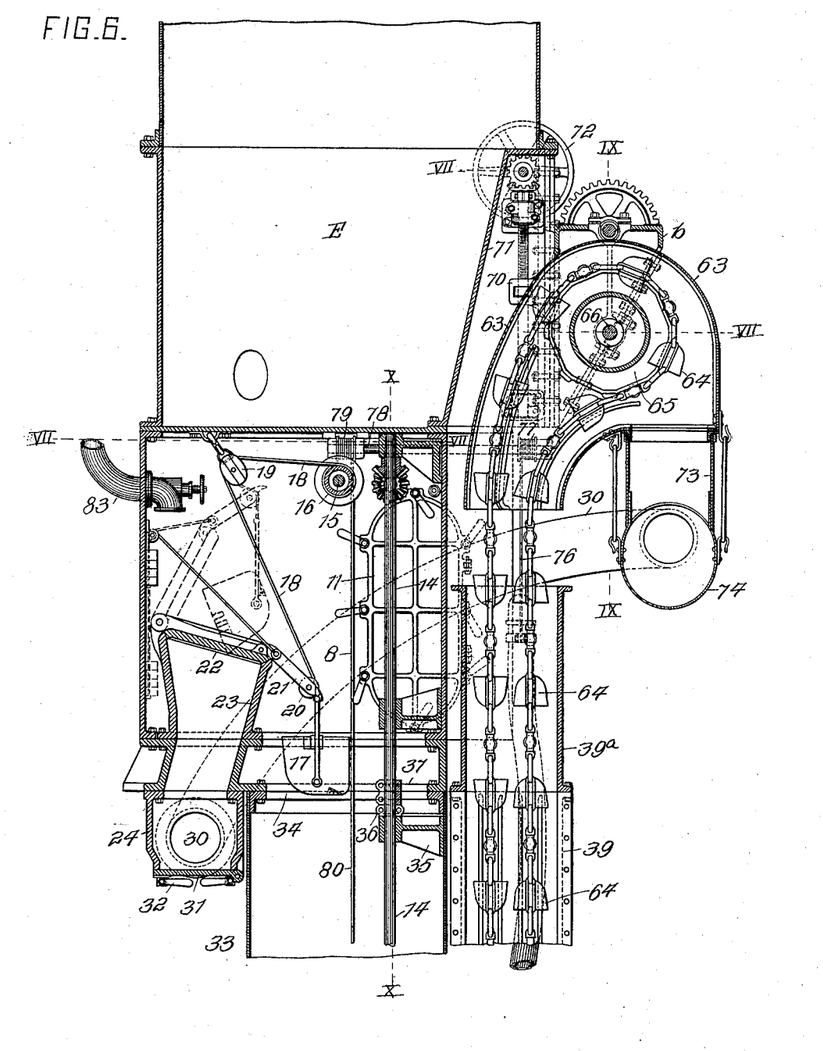
Fig. 6 is a sectional elevation of the upper portion of the caisson, the plane of section being indicated by the line VI VI, Fig. 7.
Figures 11, 12, 13, 14:
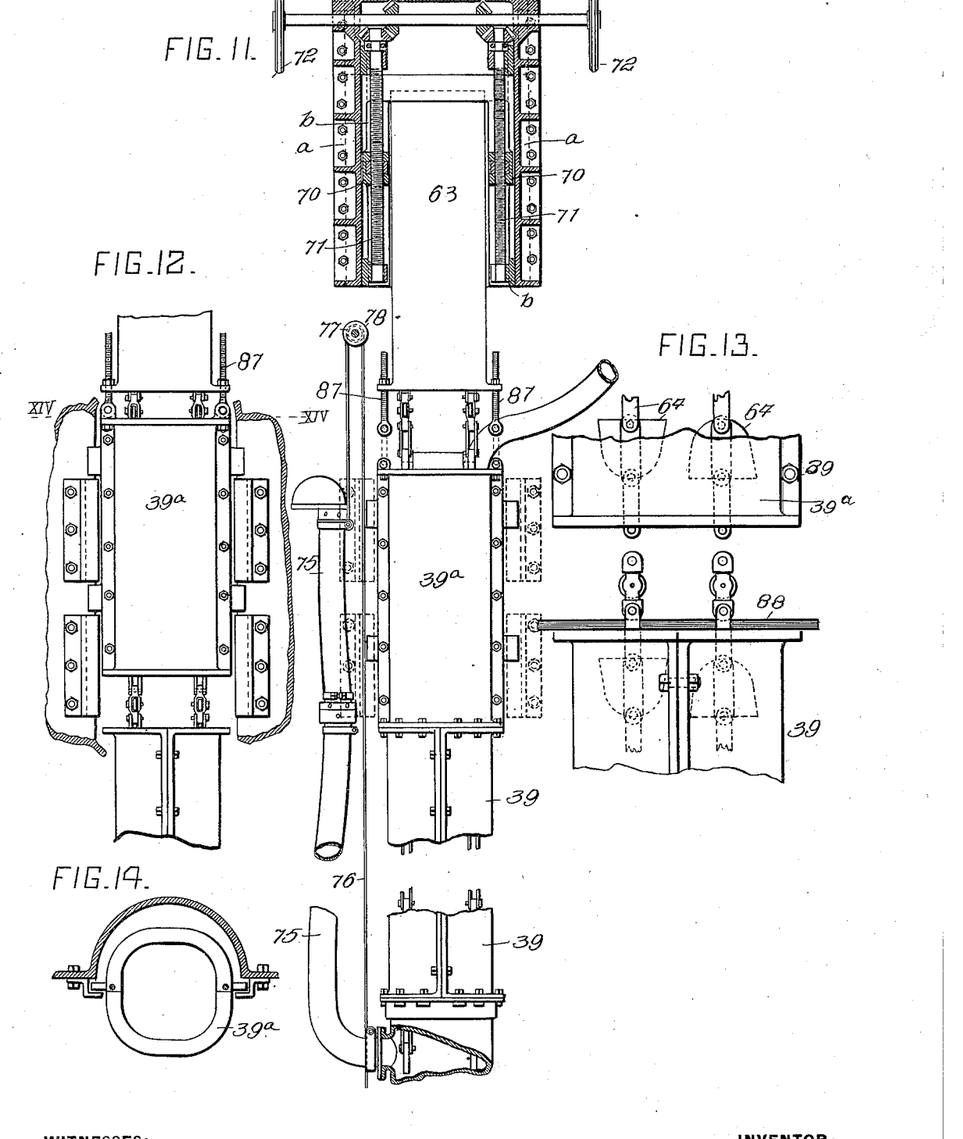
Fig. 11 is a view, partly in section and partly in elevation, of the discharge-conduit on a plane indicated by the line XI XI, Fig. 7.
Figs. 12 and 13 are detail views of the discharge-conduit.
Fig. 14 is a sectional plan on a plane indicated by line XIV XIV, Fig. 12.

The discharge-conduit, which passes up alongside of the tubular shaft or tunnel, is formed of a series of sections of a length preferably equal to the sections of the tunnel heretofore described, said sections being provided with flanges whereby they may be connected together, as clearly shown in Figs. 12, 13, and 14. This conduit is preferably made of such a length that its upper end will be above the level of the water in which work is being performed. The conduit-head 63 is arranged in a frame b, which is preferably independent of the conduit, and is detachably secured on the air-chamber or the section of the submerging-tank immediately above the same. The conveying-buckets 64, which are carried by an endless chain formed of separable sections, are arranged within the conduit and head. This chain passes around a driving-pulley 65, mounted on the shaft 66, passing through the conduit-head, and a pulley 67, mounted on the shaft 68, passing through the lower end of the conduit. The frame b, carrying the conduit-head, is provided with guide-wings 63$^a$, arranged to move in guides a, secured in a recess in the lower end of the submerging-tank, and is provided at its sides with lugs 70, recessed for the reception of nuts, through which pass threaded rods 71, said rods being driven through suitable gearing by the hand-wheel 72. By the rotation of these rods the conduit-head can be raised or lowered, thereby adjusting the tension of the bucket-chains as required. As the buckets pass around the driving-pulley the contents are discharged through the nozzle 73 of the head into a receiving-basin 74, which forms an enlargement of the pipe 30, heretofore referred to, through which a constant stream of water under pressure is maintained. The dirt, &c., is removed from the basin 74 by this stream of water and discharged into a scow or other reservoir located in convenient proximity to the discharge-nozzle of the basin. A pipe 75 has its lower end connected to the conduit at a point above the working chamber, as shown in Figs. 11 and 15. The upper end of this pipe is held above the level of the water in which the work is being performed by means of a rope 76, connected to a drum 77 on the shaft 78. This shaft, as shown in Figs. 6 and 7, passes into the working chamber B and is provided with a driving-drum 79, around which is passed a rope 80, extending down into the working chamber, where it is attached to a winding-drum 81, so that by pulling on the rope 80 the discharge end of the pipe 75 can be raised or lowered, as required.

In operating my improved caisson, the scow having been secured in position by any suitable means, the caisson is allowed to move down until its lower end rests upon the bed of the river or other body of water. Water is then pumped into the sinking or submerging tank E, on top of the air-chamber B, through the pipe 82, said tank being formed in sections, as shown, so that a larger or smaller body of water may be employed, as required, to sink the caisson. Air is now forced into the air-chamber and tunnel through the pipe 83, the doors of the air-lock having been closed and sealed. As the pressure accumulates within the caisson any water therein will be forced out through the branch 43, conduit 39, and the pipe 75 until the level of the water in the caisson reaches the level of the opening of the branch 43. Workmen can now enter the air-chamber and descend into the shaft, so as to adjust the digging mechanism in the working chamber. If the depth of water in the working chamber is too great, the surplus can be removed by operating the buckets 44, which will raise the water from the lower end of the caisson and discharge it into the pipe 43, the pressure of the air on the water in this pipe and conduit maintaining the water therein at a constant level. By the operation of the buckets the dirt is removed from within the caisson and discharged into the branch 43, down which it will pass to the lower end of the conduit, where it is caught by the buckets 64 and raised up and discharged into the basin 74. The upper end of the conduit is maintained above the level of the water in which work is being performed, so that none of the dirt contained in the buckets can be washed therefrom and in order that a pressure in excess of that necessary to balance a column of water equal to the depth of water in which work is being done may be obtained, if desired.

The pressure of air within the air-chamber and tunnel can be regulated by raising and lowering the upper end of the pipe 75, which contains the column of water connected with the conduit. By increasing or decreasing the height of this column of water contained in the pipe 75 the pressure in the chamber can be regulated—that is to say, by increasing the height of this water column a greater pressure can be maintained. In order to replace any water removed by the bucket 64 and insure a column of water within the pipe 75 and in the conduit of sufficient height to balance the air-pressure within the caisson, a supply-pipe 84 is arranged so as to discharge water into the conduit, as shown in Fig. 12. When in operation, a sufficient quantity of water in excess of the amount removed by the buckets 64 is discharged into the conduit by the pipe 84, the surplus escaping from the upper end of the pipe 75. In case the man within the working chamber notices a dropping down of the water in the branch 43 he immediately raises the pipe 75 by the rope 76, thereby requiring an increase in the height of the water columns in the conduit and pipe 75 before any further escape of water from the latter can occur. This increase in height of the water columns will counterbalance the increased pressure in the working chamber, which caused a lowering of the water in branch 43.

Figure 1:
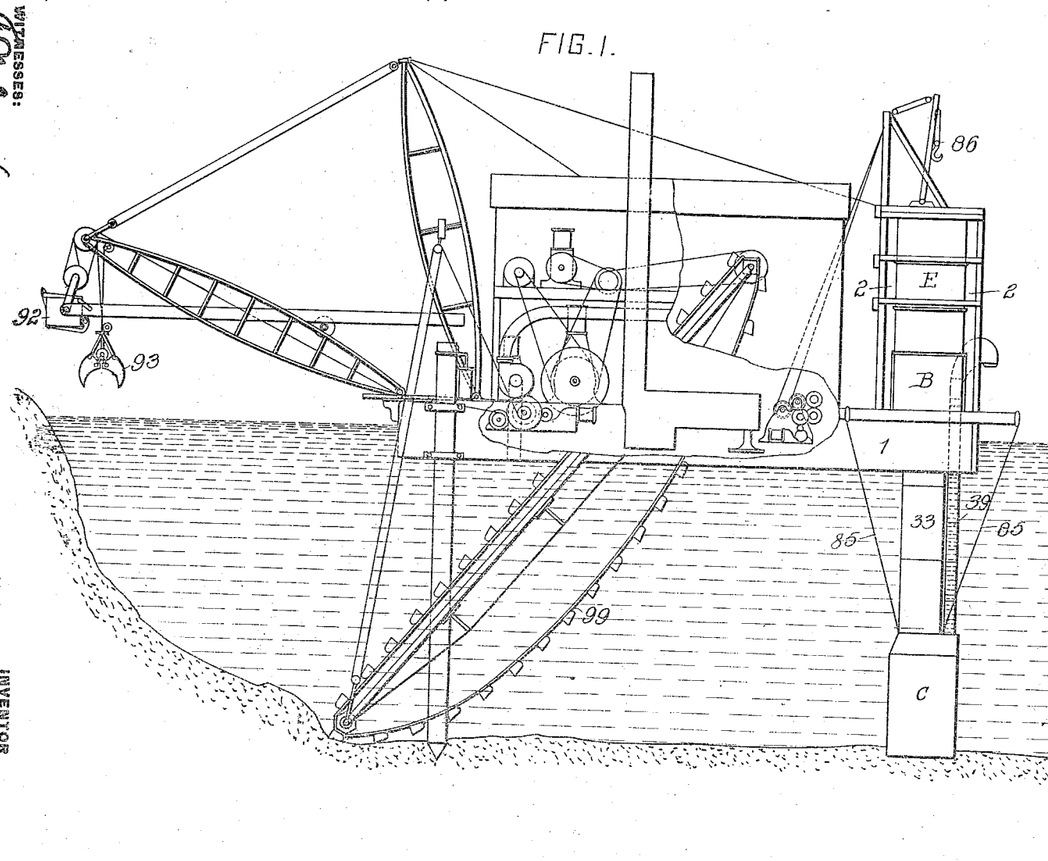
Figure 1 shows a float having my improved caisson connected to one end thereof and also provided with suitable mechanism—such as dippers, buckets, and clam-shells—for the removal of dirt, &c., from the bottom of the river, &c., and mechanism for operating such devices.
Figure 5:
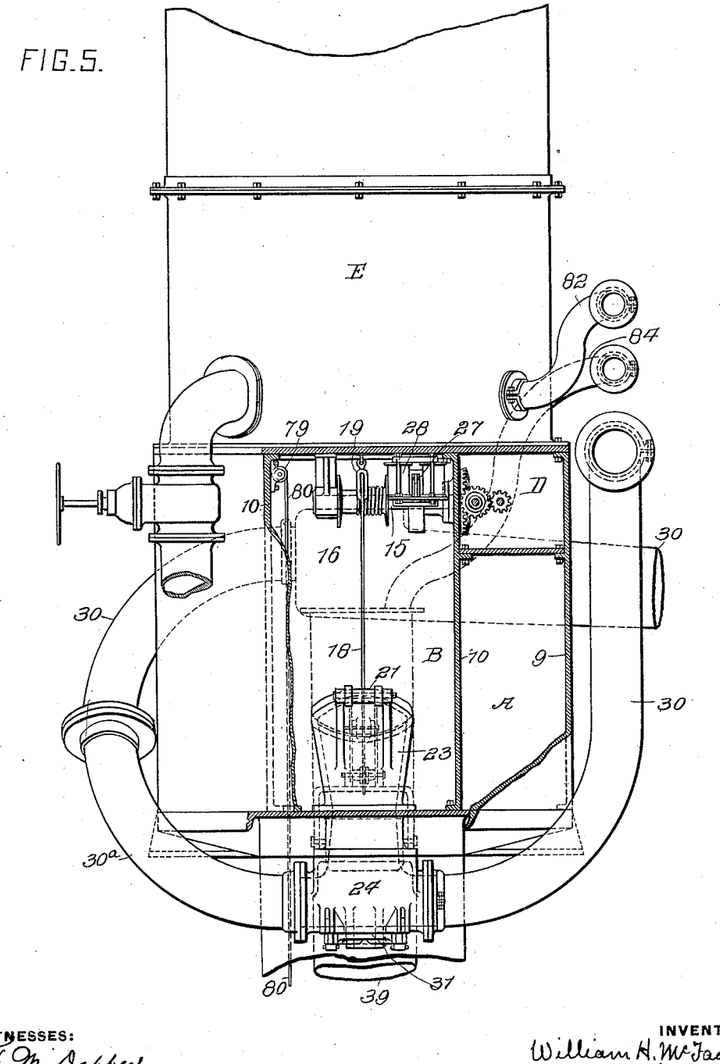
Fig. 5 is a view in elevation of the upper portion of the caisson, showing the air-chamber and a portion of the superincumbent tank, whereby weight may be imposed on the caisson for forcing the latter down, as hereinafter described.

When it is desired to add sections to the tunnel and conduit, the entire caisson may be raised by means of chains 85, connected to the working chamber, as shown in Figs. 1 and 5, assisted by the block and tackle 86 on the frame surrounding the caisson, until the shoulders 8 on the air-chamber are above the supporting-bracket 7. These brackets are then turned in to support the caisson in its raised position. The bolts connecting the upper section of the tunnel to the air-chamber and the upper section 39ª of the conduit with the adjacent lower section are then removed. The section 39ª is then raised by the screws 87, connecting said section with the conduit-head, a sufficient distance to permit of access to the endless chains carrying the buckets 64. A rod 88 is next slipped across the end of the conduit and through the chain, as shown in Fig. 13, to prevent the lower portion of the latter from dropping down and the chains disconnected above the rod. The working chamber with the tunnel and conduit are lowered sufficiently to permit of the insertion of new sections in the tunnel and the conduit. New sections are now placed in position and bolted to the tunnel and air-chamber and on the upper end of the conduit. An additional section of conveying-chain is also added and connected to those already in position. The caisson is now raised, so as to permit of the turning in of the supporting-brackets 7, and then lowered down to position. In lieu of raising the whole caisson, as stated, and the disconnecting of the parts the latter may be disconnected and the air-chamber, tank, conduit-head, and upper section 39ª raised by the block and tackle 86 and the new sections inserted.

Figure 3:
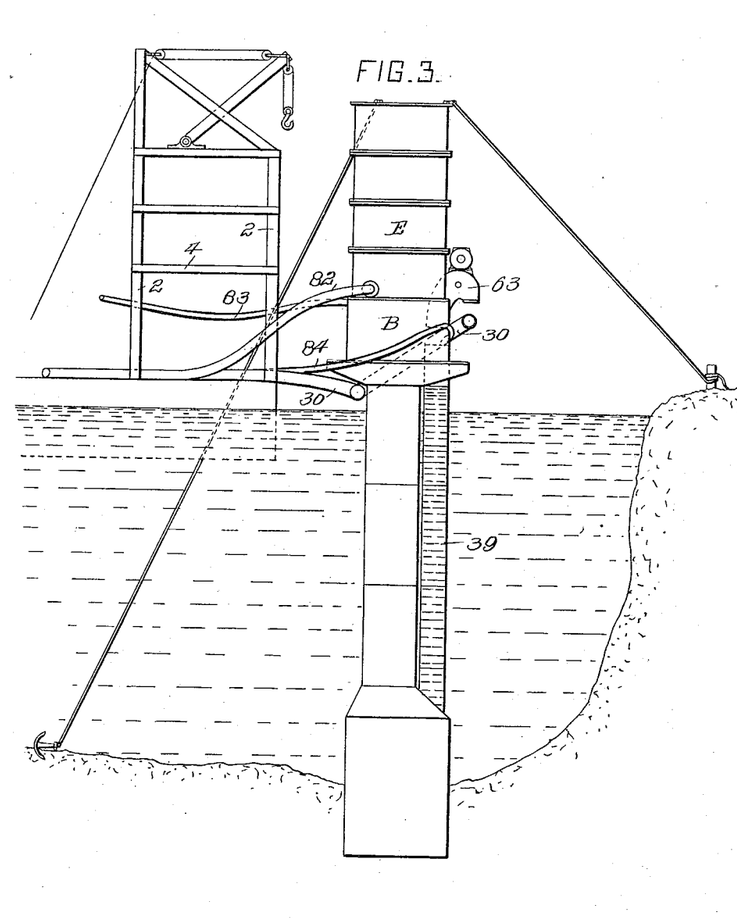
Fig. 3 is a view in side elevation, showing the caisson separated a short distance from the float or scow, but having suitable connections by pipes to pumps and air-compressors located on the float.
Figure 4:
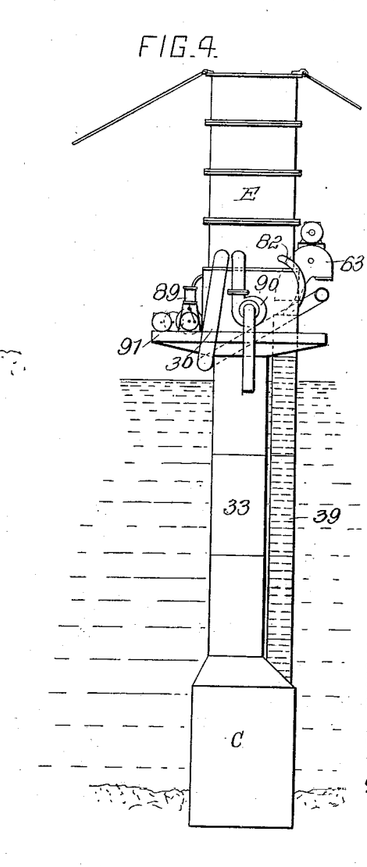
Fig. 4 is a view in elevation, showing the caisson entirely detached from the scow or float and having the pumps and compressors mounted thereon.

As shown in Figs. 3 and 4, the scow or float 1 may be moved away from the caisson after the latter has been lowered onto the bottom, the pumps on the float being connected to the air-chamber, tank, and pipes 30, 82, 83, and 84 by hose or other extensible pipe connections.

As shown in Fig. 4, the pumps 89 and 90 for supplying air to the caisson and water to the tank E may be located on a platform 91, secured to the caisson, and the pipes 30 and 84 connected to the tank, thereby rendering the caisson entirely independent of the float after it has been lowered on the bottom of the river or other body of water. When the float or scow is moved away from the caisson, the latter should be held from tipping by guys 91, extending to posts or other suitable anchors.

Figure 2:
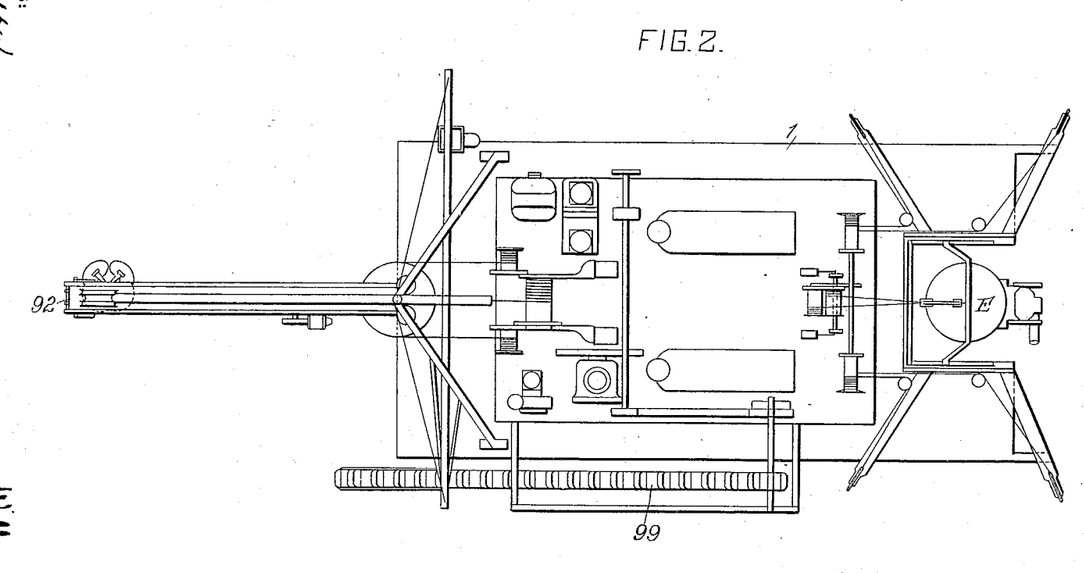
Fig. 2 is a top plan view of the same.

As shown in Figs. 1 and 2, the float or scow may be provided with a power-dipper 92, clam-shells 93, and buckets 94 for ordinary dredging operations.

I claim herein as my invention—

1. In a caisson, the combination of an air-chamber provided with an air-lock, an open-ended working chamber, a tubular shaft or tunnel connecting the air and working chambers, formed of separable sections, and a submerging-tank arranged on the air-chamber, substantially as set forth.

2. In a caisson, the combination of an air-chamber, a working chamber, tubular shaft or tunnel connecting the air and working chambers, and a water-sealed discharge-opening from the air-chamber, substantially as set forth.

3. In a caisson, the combination of an air-chamber, a working chamber, a tubular shaft or tunnel connecting the air and working chambers, a discharge-box in the air-chamber and extending through the wall thereof, a pipe or tube for water under pressure intersecting the discharge end of the box, substantially as set forth.

4. In a caisson, the combination of an air-chamber, a working chamber, a tubular shaft or tunnel connecting the air and working chambers, a discharge-box in the air-chamber and extending through the wall thereof, the outer end of said box terminating in a pipe or tube for conducting a stream of water under pressure, and a sealing lid or cover for said box, substantially as set forth.

5. A caisson, having in combination, a working chamber having an open lower end, and a water-sealed U-shaped discharge-conduit having one arm opening within the working chamber and the other arm extending from the working chamber to a point above the level of the water, substantially as set forth.

6. A caisson, having in combination, a working chamber having an open lower end, a water-sealed conduit extending from the working chamber to a point above the level of the water and means for varying the height of the water column controlling the water seal, substantially as set forth.

7. A caisson, having in combination, a working chamber having an open lower end, a discharge-conduit extending from the working chamber to a point above the level of the water and provided, within the working chamber, with a receiving branch having an open upper end and means for maintaining the water within the conduit at a height not less than the level of water outside of the conduit, substantially as set forth.

8. A caisson, having in combination, a working chamber having an open lower end, a discharge-conduit extending from the working chamber to a point above the level of the water and provided with a receiving branch, a turning head, a conveyer connected to said head, said parts being so arranged that the material from the conveyer will be discharged into the branch in all positions of the turning head, substantially as set forth.

9. A caisson, having in combination, an air-chamber, a working chamber, a tubular shaft or tunnel connecting the air and working chambers, a discharge-conduit extending from the working chamber to a point above the level of the water, a conduit-head movably mounted on the air-chamber, an endless chain provided with brackets arranged within the conduit and head, a receiving branch having an open upper end connected to the conduit within the working chamber, and a digging mechanism movably mounted on the receiving branch, substantially as set forth.

10. A caisson, having in combination, an air-chamber, a working chamber, a tubular shaft or tunnel connecting the air and working chambers, formed of separable sections, a discharge-conduit formed of separable sections, extending from the working chamber to a point above the level of the water, and provided with a receiving branch within the working chamber, a digging mechanism within the working chamber, a power-shaft extending from the air-chamber to the working chamber formed of separable sections mounted in suitable bearings within the sections of the tubular shaft or tunnel, substantially as set forth.

11. A caisson, having in combination, an air-chamber, a working chamber, a tubular shaft or tunnel connecting the air and working chambers, a submerging-tank arranged on the air-chamber, a discharge-box arranged within the air-chamber and extending through the wall thereof, and a pipe or tube extending from the submerging-tank and intersecting the discharge end of the box, substantially as set forth.

12. The combination of a float or scow provided with guiding posts or supports, a caisson arranged between said supports, means for raising the caisson and supports movably mounted on the float for holding the caisson in raised position, substantially as set forth.

In testimony whereof I have hereunto set my hand.

WILLIAM H. McFADDEN.

Witnesses:
DARWIN S. WOLCOTT,
F. E. GAITHER.